(12) United States Patent
Ting

(10) Patent No.: US 7,956,842 B2
(45) Date of Patent: Jun. 7, 2011

(54) POINTING INPUT SYSTEM AND METHOD USING ONE OR MORE ARRAY SENSORS

(75) Inventor: Albert Ting, Toufen Township, Miaoli County (TW)

(73) Assignee: Micro-Nits Co., Ltd., Miaoli County (TW)

( * ) Notice: Subject to any disclaimer, the term of this patent is extended or adjusted under 35 U.S.C. 154(b) by 1493 days.

(21) Appl. No.: 11/149,426

(22) Filed: Jun. 10, 2005

(65) Prior Publication Data

US 2006/0007134 A1 Jan. 12, 2006

(30) Foreign Application Priority Data

Jun. 11, 2004 (TW) ................................ 93116930 A

(51) Int. Cl.
*G09G 5/00* (2006.01)

(52) U.S. Cl. ....................................... 345/156; 345/169

(58) Field of Classification Search .......... 345/156–158, 345/180–183
See application file for complete search history.

(56) References Cited

U.S. PATENT DOCUMENTS

| | | | |
|---|---|---|---|
| 5,504,501 A * | 4/1996 | Hauck et al. | 345/158 |
| 6,727,885 B1 * | 4/2004 | Ishino et al. | 345/156 |
| 7,039,253 B2 * | 5/2006 | Matsuoka et al. | 382/295 |
| 7,193,608 B2 * | 3/2007 | Stuerzlinger | 345/156 |
| 2001/0022575 A1 * | 9/2001 | Woflgang | 345/156 |
| 2003/0011566 A1 * | 1/2003 | Gomi et al. | 345/157 |

FOREIGN PATENT DOCUMENTS

| | | |
|---|---|---|
| JP | 2001325069 | 11/2001 |
| JP | 2003173235 | 6/2003 |

* cited by examiner

*Primary Examiner* — Nitin Patel

(74) *Attorney, Agent, or Firm* — Rabin & Berdo, P.C.

(57) ABSTRACT

In a pointing input system and method, a pointer applies a light spot on a screen, an array sensor shoots on the screen to generate a first data for an identification system to retrieve a second data therefrom, the second data includes the position information of the light spot for an information system to apply a correlated output on the screen. The second data is generated based on an optical distortion information and a spatial rotation and displacement information determined by an alignment procedure that comprises applying an input for alignment on the screen for the array sensor to shoot to generate an alignment data, and comparing the alignment data with a reference data.

33 Claims, 12 Drawing Sheets

POINTING INPUT SYSTEM AND METHOD USING ONE OR MORE ARRAY SENSORS

FIELD OF THE INVENTION

The present invention is related generally to a system and method for direct inputs on a screen and more particularly, to a pointing input system and method for an information system.

BACKGROUND OF THE INVENTION

Current input apparatus available for information systems includes keyboard, mouse, trackball, light pen, and touch panel. The trackball is not suitable to be used for writing on an upright screen. The light pen is only available for the inputs on a scanning screen such as Cathode-Ray Tube (CRT) screen, but not for the inputs on a high resolution screen. The touch panel is disadvantageous to alignment and portability for larger-scale screens. Due to the significant barrel or pincushion distortion of the optical lens, the input systems using conventional sensors may often suffer the alignment degradation caused by the mistakes or unintentional touches to the equipment, and even have to be suspended during its use accordingly. Therefore, single keyboard and/or single mouse installed on a computer system is still relied on currently for the inputs to an information system using an upright large-scale screen. However, single input apparatus is inconvenient for use in the situation where multiple inputs from several persons or opinion exchanges between several persons are required.

Therefore, it is desired a pointing input system and method easy for alignment, capable of precise positioning, and available for high resolution applications.

SUMMARY OF THE INVENTION

One object of the present invention is to provide a pointing input system and method for an information system.

Another object of the present invention is to provide a pointing input system and method for direct inputs on an upright large-scale screen.

In a pointing input method according to the present invention, a light spot is applied on a screen, the screen is shot by an array sensor to generate a first data, a second data including the position information of the light spot is retrieved from the first data, and an output corresponding to the light spot is applied on the screen. The second data is generated from the first data based on an optical distortion information and a spatial rotation and displacement information determined by an alignment procedure that comprises applying an input for alignment on the screen for the array sensor to shoot on the screen to generate an alignment data, and comparing the alignment data with a reference data.

In a pointing input system according to the present invention, a first buffer stores a reference data and an alignment data generated in an alignment procedure, a processor analyzes the alignment data and compares the alignment data with the reference data to obtain an optical distortion information and a spatial rotation and displacement information of an optical lens in an array sensor that is used to shoot on a screen in the alignment procedure, a second buffer stores the optical distortion information and spatial rotation and displacement information, a pointer applies a light spot on the screen for the array sensor to shoot to generate a first data, an identification system retrieves a second data including the position information of the light spot from the first data, and a display system applies an output corresponding to the light spot on the screen.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Transformation Between Two Coordinate Systems

Figure 1:
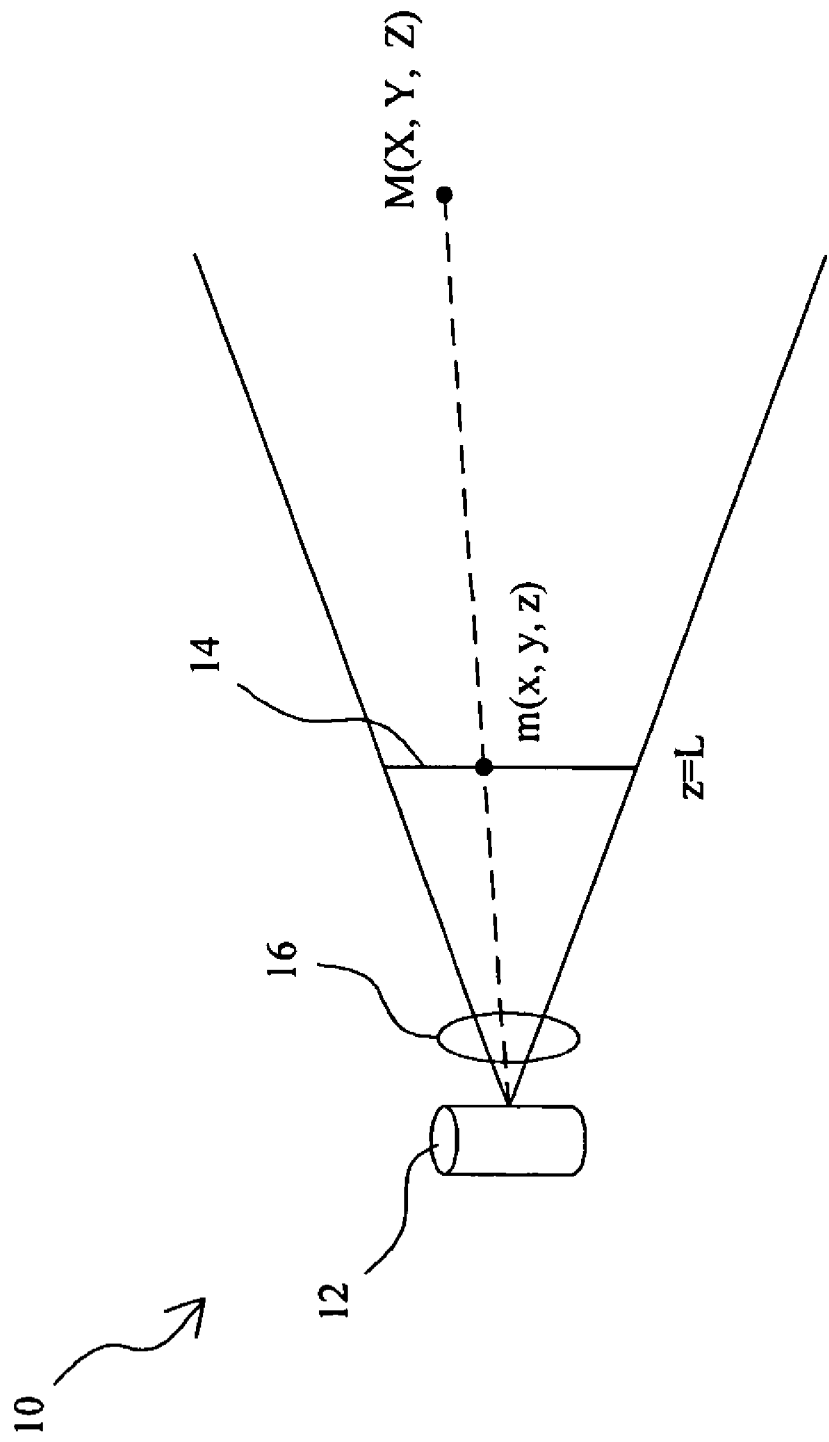
FIG. 1 shows a space where an array sensor is used.

In a space 10, as shown in FIG. 1, an array sensor 12 has a focus plane 14 apart from the array sensor 12 with a distance L, a point M(X, Y, Z) in the space 10 is mapped to a point m(x, y, z)=m(X×L/Z, Y×L/Z, L) on the focus plane 14, where X, Y, Z, x, y, and z are the coordinates of the respective points M and m. If an optical lens 16 for mapping onto the array sensor 12 has an optical distortion, due to the polar symmetric to the central point of the optical lens 16, the spatial relationship between the optical lens 16 and the original point of the array sensor 12 is first determined, and further to transform the original coordinates to a polar coordinates as in the following $$m = A[RT]M, \quad (\text{EQ-1})$$

$$A = \begin{bmatrix} f_x & 0 & c_x \\ 0 & f_y & c_y \\ 0 & 0 & 1 \end{bmatrix}, \quad (\text{EQ-2})$$

$$R = \begin{bmatrix} r_{11} & r_{12} & r_{13} \\ r_{21} & r_{22} & r_{23} \\ r_{31} & r_{32} & r_{33} \end{bmatrix}, T = \begin{bmatrix} t_1 \\ t_2 \\ t_3 \end{bmatrix}, \text{ and} \quad (\text{EQ-3})$$

-continued $$\hat{x} = x + x[k_1r^2 + k_2r^4] + [2p_1xy + p_2(r^2 + 2x^2)],$$ (EQ-4)
$$\hat{y} = y + y[k_1r^2 + k_2r^4] + [2p_2xy + p_2(r^2 + 2y^2)],$$
$$r^2 = x^2 + y^2,$$

where matrix A is the transformation matrix of the combination of the array sensor 12 and optical lens 16, $f_x$ and $f_y$ are the focus distances along the X axis and Y axis, $c_x$ and $c_y$ are the coordinates of the central point of the image mapped by the optical lens 16 onto the array sensor 12, x and y are the coordinates at the array sensor 12 with the point ($c_x$, $c_y$) as the central point, matrixes R and T are the transformation matrix resulted from the rotation and displacement in the space 10, $k_1$ is the second-order radial distortion, $k_2$ is the fourth-order radial distortion, $p_1$ is the second-order tangent distortion, and $p_2$ is the fourth-order tangent distortion.

First Embodiment of Alignment Procedure

Figure 2:
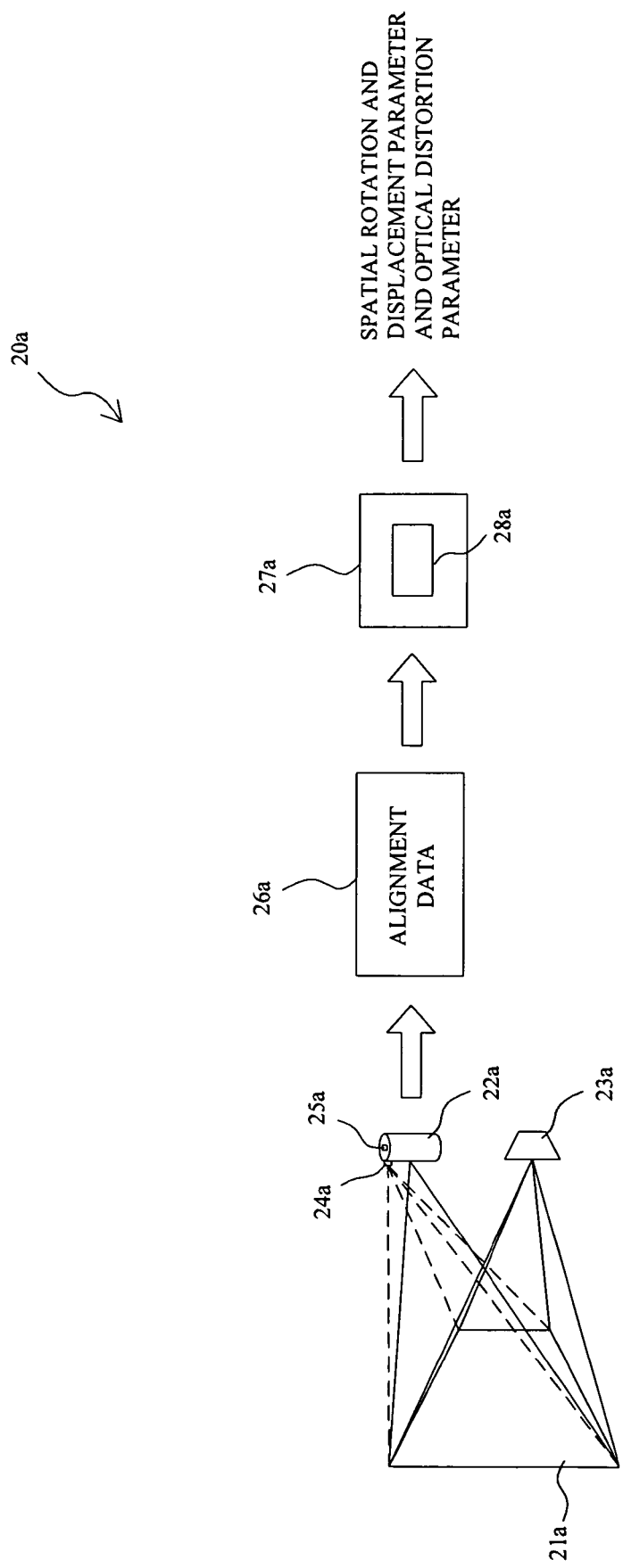
FIG. 2 shows a first embodiment of an alignment procedure according to the present invention.
Figure 3:
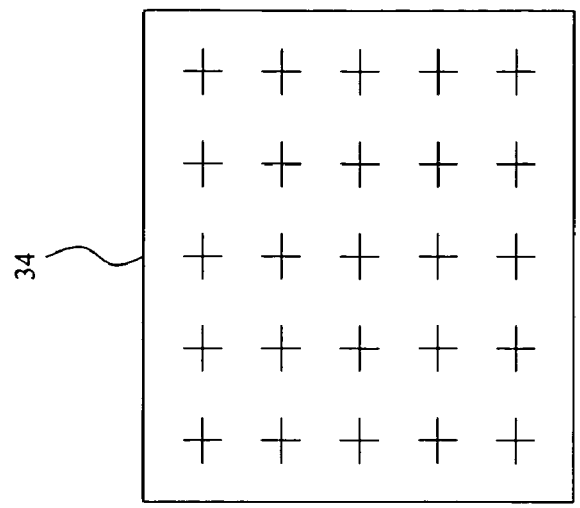
FIG. 3 shows three exemplary test patterns for the alignment procedure illustrated in FIG. 2.
Figure 3:
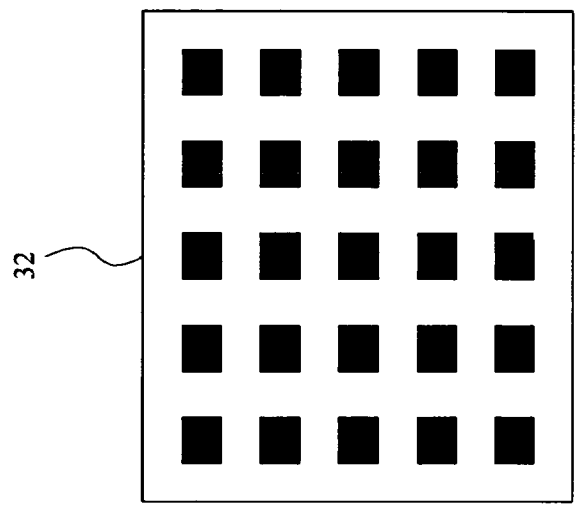
Figure 3:
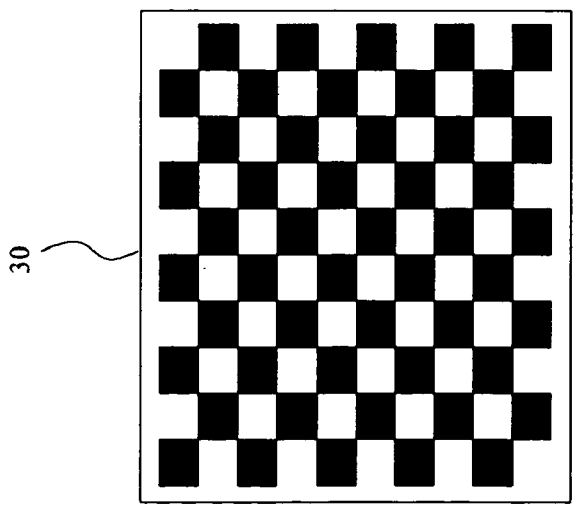

FIG. 2 shows an alignment procedure 20a for a pointing input system applied for an information system using front projection. To identify the shooting range of an array sensor 22a on a screen 21a, it is used a viewing window 25a on the array sensor 22a to inspect on the screen 21a or light beams emitted by high intensity Light-Emitting Diodes (LEDs) or laser diodes 24a on the array sensor 22a to project light spots on the screen 21a. Then an input for alignment is applied on the screen 21a, for example displaying a test pattern on the screen 21a by a front projector 23a. FIG. 3 shows three exemplary test patterns, chessboard pattern 30, square pattern 32, and cross pattern 34. However, the test pattern may be other predetermined patterns in some other embodiments. The array sensor 22a shoots the test pattern on the screen 21a to generate an alignment data 26a that is further sent to a computer system 27a. The alignment data 26a includes the image information of the test pattern generated by the array sensor 22a, and an image recognizing software and spatial displacement and rotation calculation tool programs 28a are running on the computer system 27a to analyze the relative positions and three-dimensional relationship of several points on the test pattern from the alignment data 26a and a reference data. Briefly, the alignment data 26a is the one obtained by shifting and rotating the original test pattern in a three-dimensional space, and by comparing the alignment data 26a with the reference data, the spatial relationship between the screen 21a and array sensor 22a is determined. As a result, a spatial rotation and displacement information is obtained, which describes the spatial transformation between the screen 21a and array sensor 22a. By comparing the relative positions between the several points, in association with the lens distortion equation such as EQ-4, it is determined an optical distortion information for the optical lens in the array sensor 22a to further modify the spatial relationship between the screen 21a and array sensor 22a. The screen 21a may have a planar surface, a regularly curved surface, or an irregularly curved surface. In the circumstances of regularly or irregularly curved surface such that the arithmetic computation for the spatial transformation is too complicated, bilinear interpolation may be used to calculate the coordinates of the several points in the alignment data 26a and reference data to conduct the spatial transformation relationship. The information s generated by the alignment procedure 20a pictures the spatial relationship between the screen 21a and array sensor 22a and the optical distortion of the optical lens in the array sensor 22a.

Second Embodiment of Alignment Procedure

Figure 4:
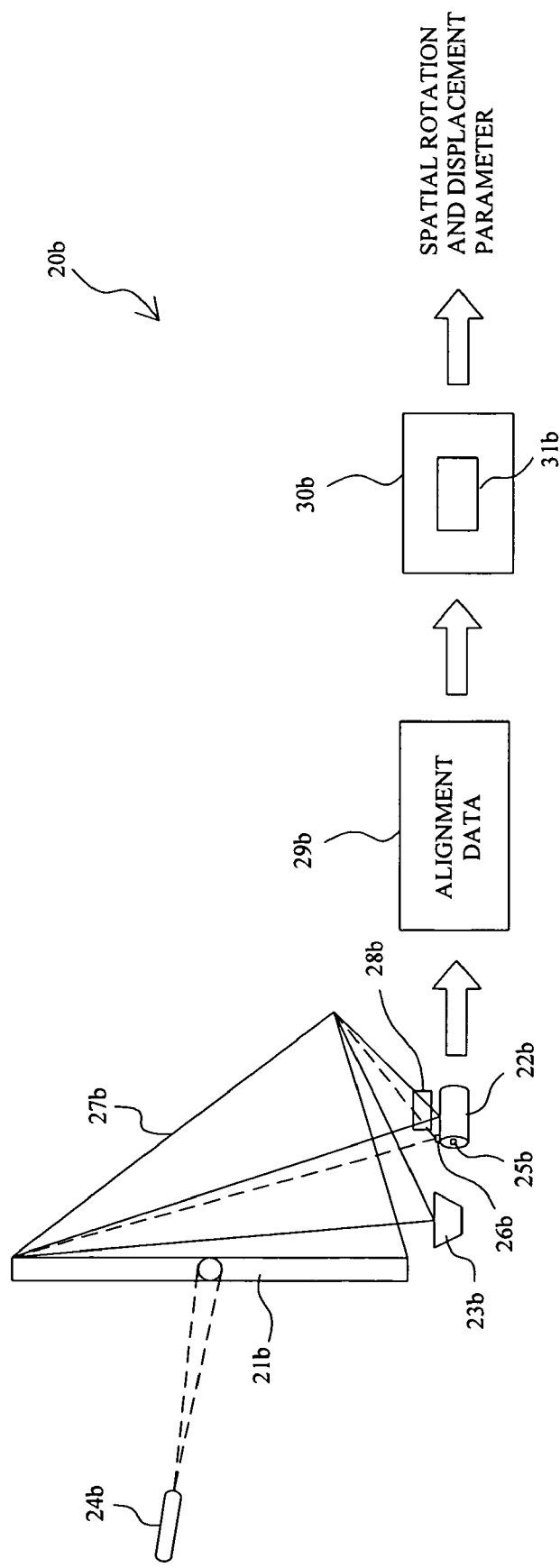
FIG. 4 shows a second embodiment of an alignment procedure according to the present invention.

FIG. 4 shows an alignment procedure 20b for a pointing input system applied for an information system using rear projection. To identify the shooting range of an array sensor 22b on a screen 21b, it is used a viewing window 25b on the array sensor 22b to inspect on the screen 21b or light beams emitted by high intensity LEDs or laser diodes 26b on the array sensor 22b to project light spots on the screen 21b. Then an input for alignment is applied on the screen 21b, for example applying light spots at several specific positions on the screen 21a by a pointer 24b. The light spot is reflected to the array sensor 22b by a mirror 27b. The intensive light from a rear projector 23b to project on the screen 21b may be reflected by the mirror 27b to generate highly bright spots on the array sensor 22b, causing the identification more difficult. Therefore, an optical filter 28b is arranged in front of the array sensor 22b to filter out the intensive light from the projector 23b, and thereby to specify the light source of the pointer 24b from that of the projector 23b. The light spots for alignment are shot by the array sensor 22b to generate an alignment data 29b including the image information of the light spots on the screen 21b. The alignment data 29b is sent to a computer system 30b, where an image recognizing software and spatial displacement and rotation calculation tool programs 31b are running to analyze the relative positions and three-dimensional relationship of several points in the alignment data 29b and a reference data. By comparing with the reference data that includes the spatial information regarding to the specific positions on the screen 21b to be applied with the light spots, a spatial rotation and displacement information is obtained to picture the spatial transformation between the screen 21b and array sensor 22b. The screen 21b may have a planar surface, a regularly curved surface, or an irregularly curved surface. In the circumstances of regularly or irregularly curved surface such that the arithmetic computation for the spatial transformation is too complicated, bilinear interpolation may be used to calculate the coordinates of the several points in the alignment data 26a and reference data to conduct the spatial transformation relationship. The information generated by the alignment procedure 20b pictures the spatial relationship between the screen 21b and array sensor 22b.

First Embodiment of Pointing Input System

Figure 5:
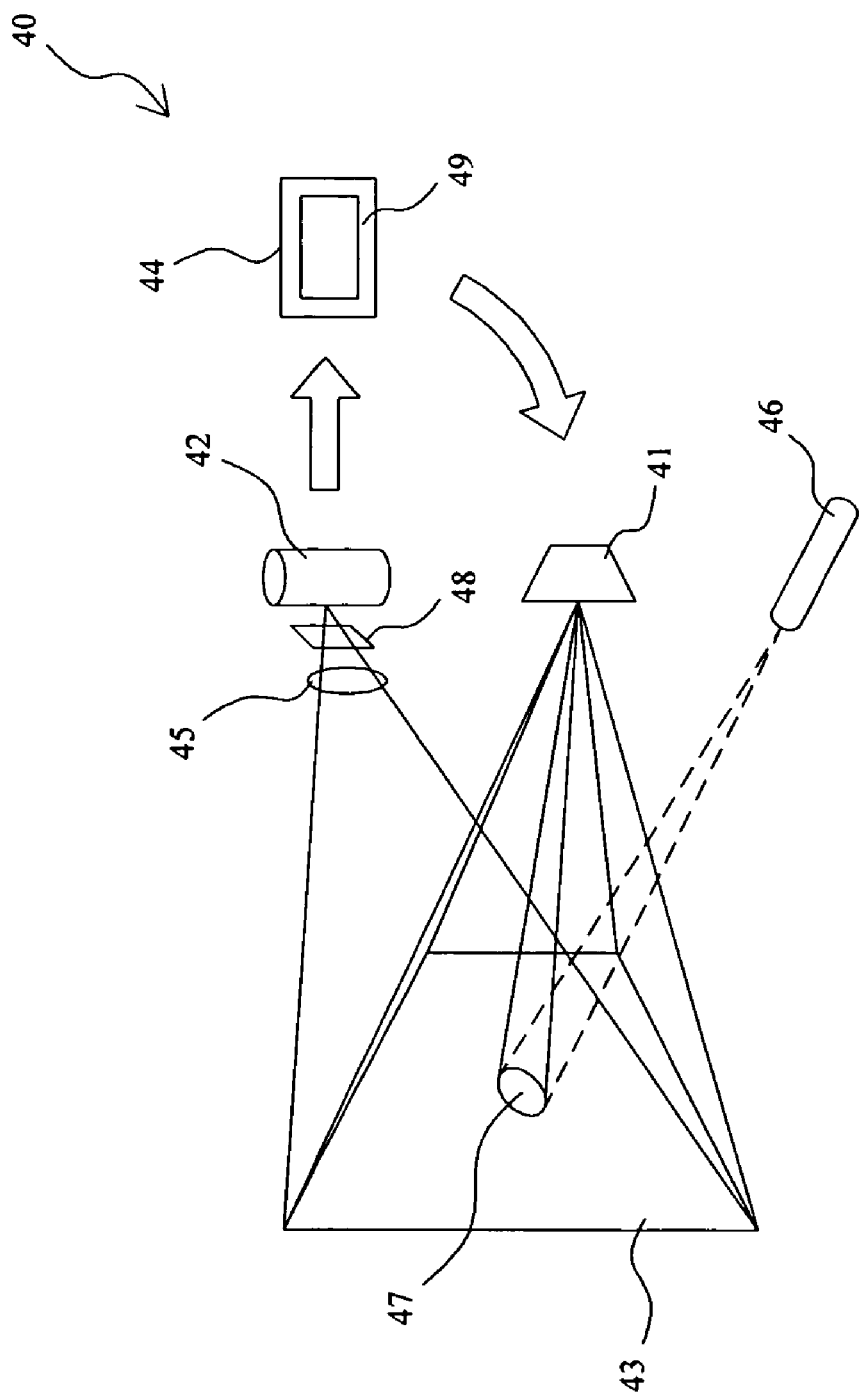
FIG. 5 shows a first embodiment of a pointing input system according to the present invention.

FIG. 5 shows a pointing input system 40 applied for an information system using single front projector 41 and single array sensor 42. In the pointing input system 40, after an alignment procedure 20a illustrated in FIG. 2, a pointer 46 could be used for direct inputs on a screen 43. The light spot 47 projected by the pointer 42 on the screen 43 is shot by the array sensor 42 to generate a first data including the image information of the light spot 47 sent to a computer system 44, where an identification system 49 running on the computer system 44 retrieves a second data including the position information of the light spot 47 from the first data based on the optical distortion information and spatial rotation and displacement information that are obtained by the alignment procedure 20a. The second data is provided for the projector 41 to display a correlated output on the screen 43. In FIG. 5, the correlated output is an image of the light spot 47, while in other embodiments, it may be a cursor moved to the position of the light spot 47, or another output generated in response to a command from the pointer 46. In the system 40, an optical lens 45 and an optical filter 48 are arranged in front of the array sensor 42 for mapping onto the array sensor 42 and filtering out the optical noise for the array sensor 42, thereby enhancing the identification carried out by the computer system 44.

Second Embodiment of Pointing Input System

Figure 6:
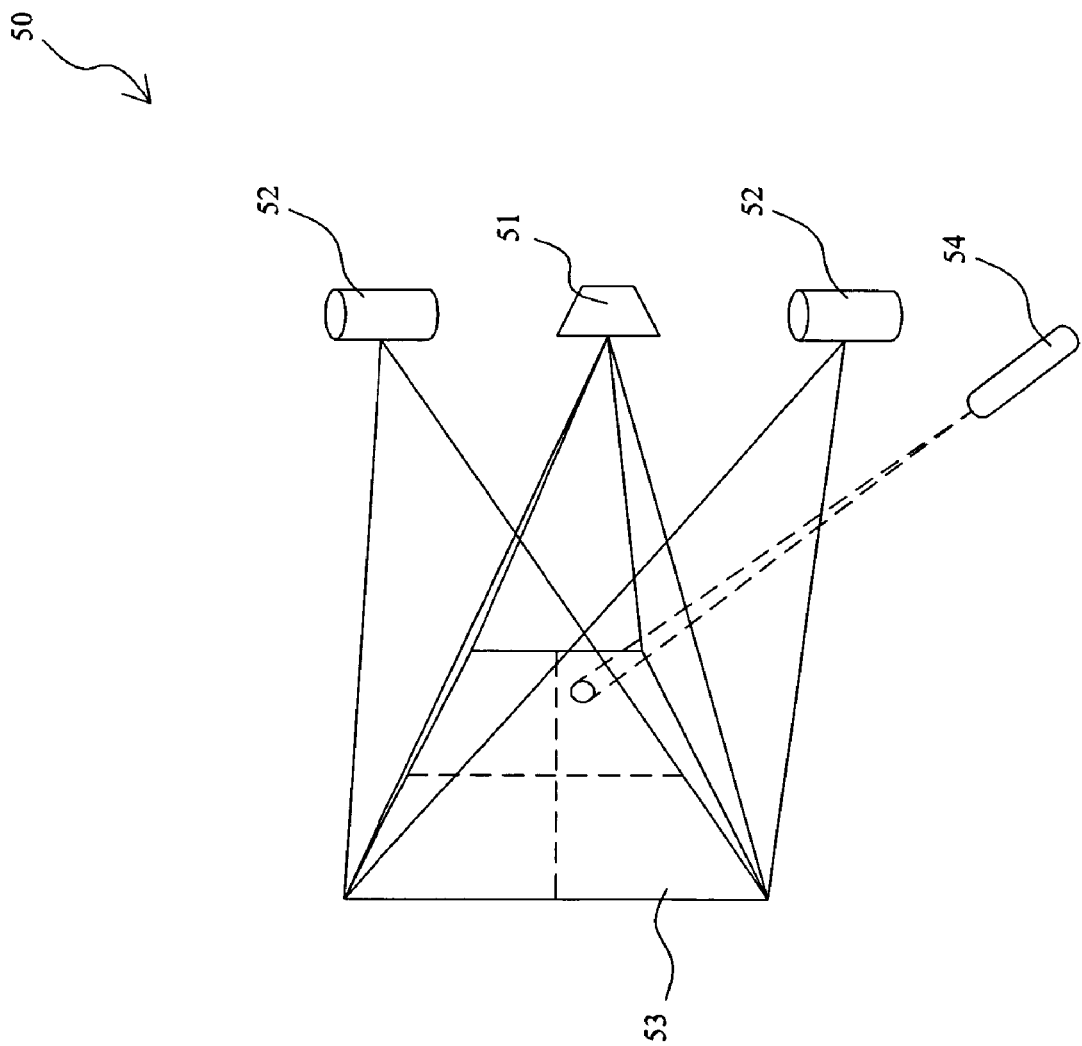
FIG. 6 shows a second embodiment of a pointing input system according to the present invention.

FIG. 6 shows a pointing input system 50 applied for an information system using single front projector 51 and multiple array sensors 52. After an alignment procedure 20a illustrated in FIG. 2, the system 50 allows a pointer 46 to directly input on a screen 53. The array sensors 52 are arranged in different directions to shoot on the screen 53, and thus, if one of them is unable to shoot the light spot on the screen 53 properly, another is switched instead to shoot on the screen 53, so as to achieve the purpose of full viewing angle without any loss.

Since several array sensors 52 are provided in the system 50, the screen 53 may have very large area for display. The other operations are referred to the first embodiment 40 illustrated in FIG. 5. The identification system is not shown in FIG. 6 for simplicity.

Third Embodiment of Pointing Input System

Figure 7:
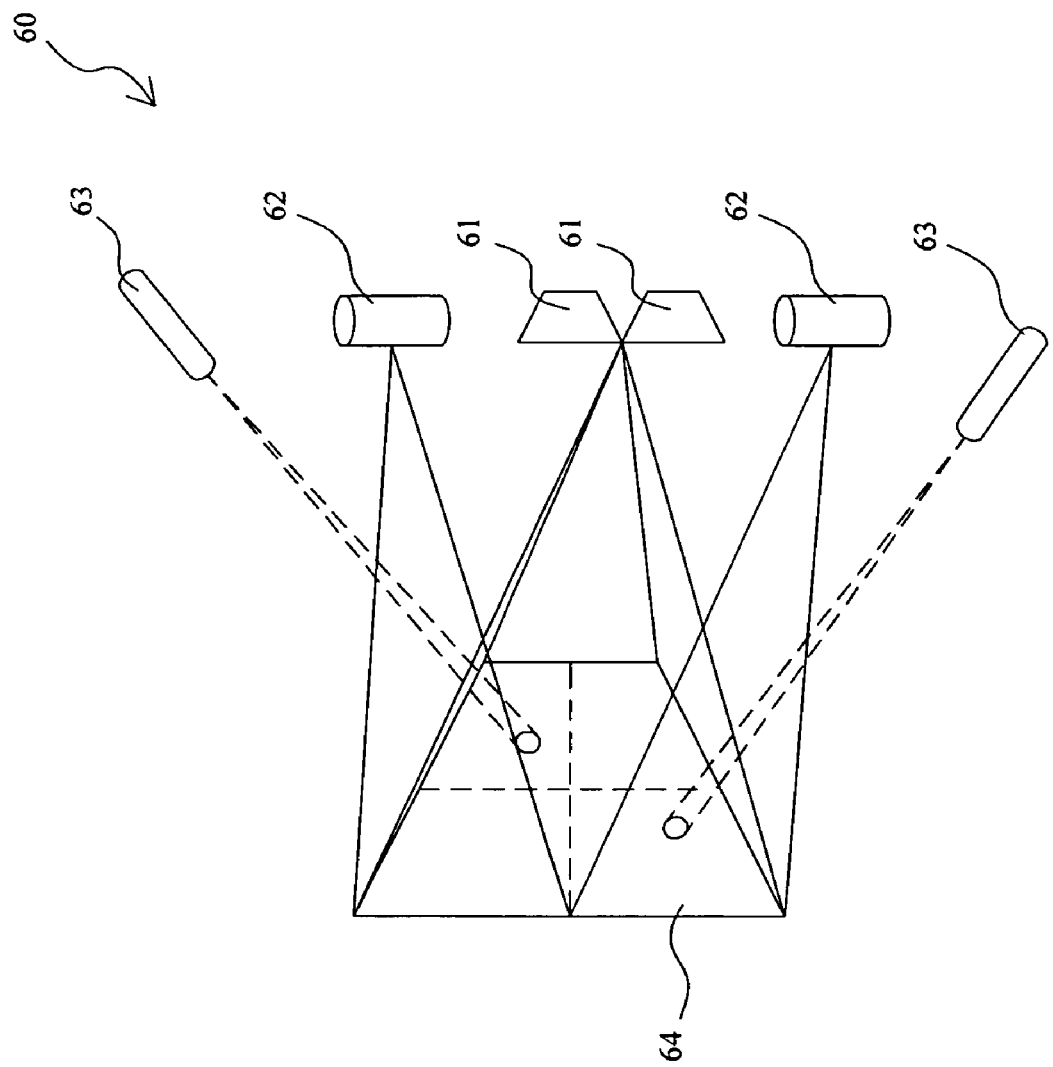
FIG. 7 shows a third embodiment of a pointing input system according to the present invention.

FIG. 7 shows a pointing input system 60 applied for an information system using multiple front projectors 61, multiple array sensors 62, and multiple pointers 63. In this system 60, a screen 64 is defined to have several projection regions each one is responsible by a projector 61 to display thereon and by an array sensor 62 to shoot thereon, so as to improve the resolution. After an alignment procedure 20a illustrated in FIG. 2, the pointers 63 are allowed in this system 60 for direct inputs on the screen 64. By using the pointers 63, it is achieved multiple inputs from several persons or opinion exchanges between several persons, without any additional equipments. Using the pointers 63 for direct inputs on the screen 63 may be referred to the first embodiment 40 illustrated in FIG. 5. The identification system is not shown in FIG. 7 for simplicity.

Fourth Embodiment of Pointing Input System

Figure 8:
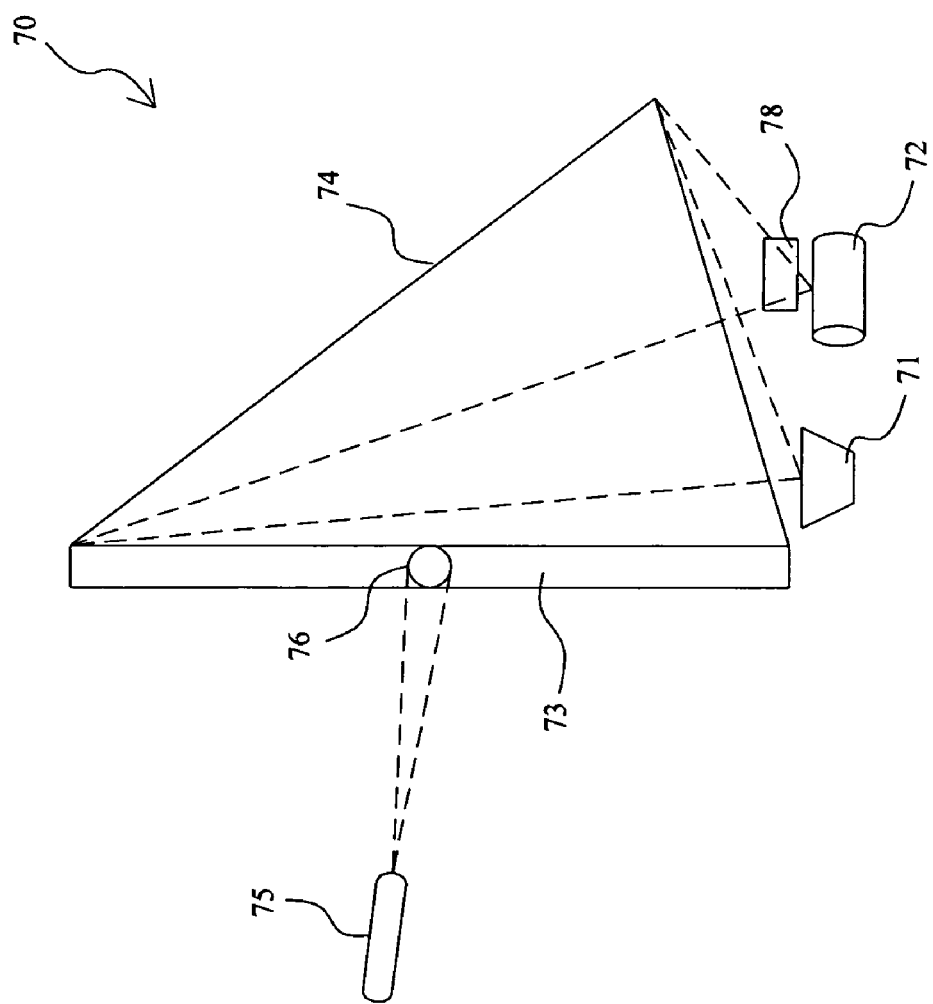
FIG. 8 shows a fourth embodiment of a pointing input system according to the present invention.

FIG. 8 shows a pointing input system 70 applied for an information system using rear projection. After an alignment procedure 20b illustrated in FIG. 4, it is allowed direct inputs on a screen 73 by a pointer 75 in this system 70. With a mirror 74, a rear projector 71 projects an image reflected on the screen 73. The mirror 74 also assists an array sensor 72 in shooting on the screen 73. The light spot 76 projected by the pointer 75 on the screen is reflected by the mirror 74 to the array sensor 72 to generate a first data including the image information of the light spot 76. The first data is sent to a computer system (not shown) for an identification system to retrieve a second data including the position information of the light spot 76 from the first data based on the spatial rotation and displacement information that are obtained in the alignment procedure 20b. The second data is provided for the projector 71 to display a correlated output on the screen 73. In FIG. 8, the correlated output is an image of the light spot 76, while in other embodiments, it may be a cursor moved to the position of the light spot 76, or another output generated in response to a command from the pointer 75. For the intensive light from the projector 71 to project on the screen 73 may be reflected by the mirror 74 to generate highly bright spots on the array sensor 72, causing the identification more difficult, an optical filter 78 is arranged in front of the array sensor 72 to filter out the intensive light from the projector 71, and thereby to specify the light source of the pointer 75 from that of the projector 71, improving the identification and repeatability.

Hardware of Pointing Input System

Figure 9:
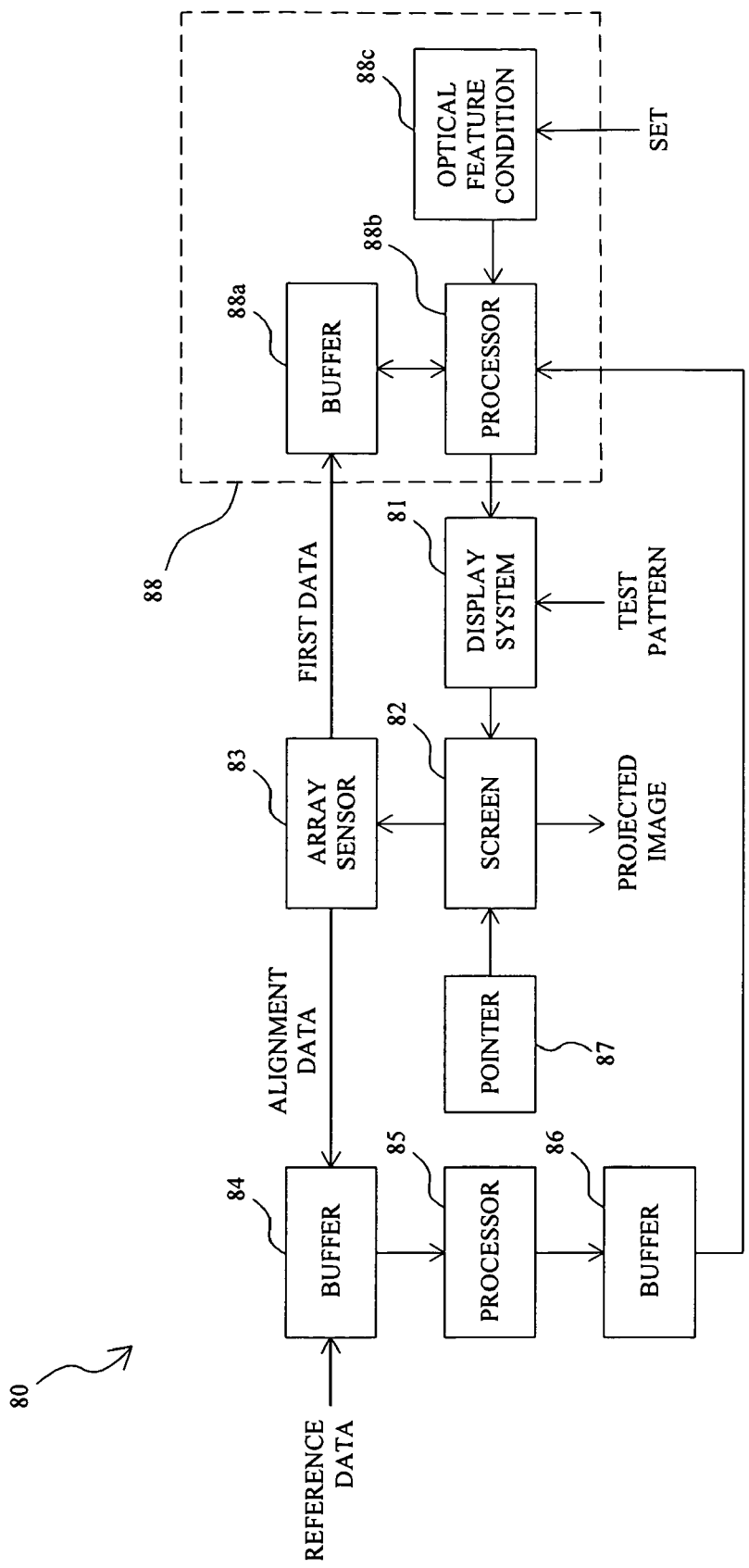
FIG. 9 shows an embodiment of hardware for a pointing input system according to the present invention.

FIG. 9 shows a pointing input system 80 according to the present invention, in which a display system 81 is provided to display on a screen 82, an array sensor 83 is prepared to shoot on the screen 82, and a pointer 87 is used to apply light spots on the screen 82 either in an alignment procedure or for a pointing input. The array sensor 83 may comprises Charge-Coupled Detector (CCD) or Complementary Metal-Oxide-Semiconductor (CMOS) sensor. In an alignment procedure, a buffer 84 is used to store a predetermined reference data that includes the spatial information of a test pattern to be displayed on the screen 82 or several specific positions on the screen 82 to be applied with light spots thereon. Particularly, the spatial information includes the relative positions of several points in the test pattern or the several specific positions on the screen 82, for example the relative directions and distances therebetween. The buffer 84 also stores an alignment data in an alignment procedure. The alignment data is generated by shooting the test pattern or light spots at the several specific positions on the screen 82 by the array sensor 83, and therefore includes the image information of the shot test pattern or light spots. A processor 85 is provided to identify and analyze the alignment data, for example with image recognizing software and displacement and rotation calculation tool programs, in comparison with the reference data to evaluate the spatial relationship between the array sensor 83 and screen 82 and the optical distortion of the optical lens in the array sensor 83. In this process, for example, the processor 85 analyzes the relative positions of several points in the test pattern or at the several specific positions on the screen 82 between the alignment data and reference data and their three-dimensional spatial relationship, to obtain a spatial rotation and displacement information. The processor 85 further compares the three-dimensional spatial coordinates of the several points to determine an optical distortion information of the optical lens in the array sensor 83 based on an optical lens distortion equation such as EQ-4. The optical distortion information and spatial rotation and displacement information are stored in a buffer 86 for use in a pointing input. For a pointing input, a light spot is applied on the screen 82 by the pointer 87, and the array sensor 83 shoots on the screen 82 to generate a first data including the image information of the light spot. The first data is sent to an identification system 88, where it is identified for the light spot and a second data including the position information of the light spot is generated based on the optical distortion information and spatial rotation and displacement information provided by the buffer 86. The second data is provided for the display system 81 to apply a correlated output on the screen 82. In this embodiment, the identification system 88 comprises a buffer 88a to store the first data generated by the array sensor 83, a register 88c to provide an optical feature condition, and a processor 88b to check the light spot from the first data to find out the nearby pixels satisfying the optical feature condition to define an output spot, and to calculate the information including the size, average brightness, hue, length, width and area of the light spot that may be also included in the second data.

The screen 82 may have a planar surface, a regularly curved surface, or an irregularly curved surface, and may be an active screen such as CRT screen, LCD screen, plasma screen, and rear projection screen, or a passive screen such as scattering screen of front projector. All the data to be used or processed may be stored and processed in a same computer system or separately stored and processed in different computer systems.

Flowchart of Alignment Procedure

Figure 10:
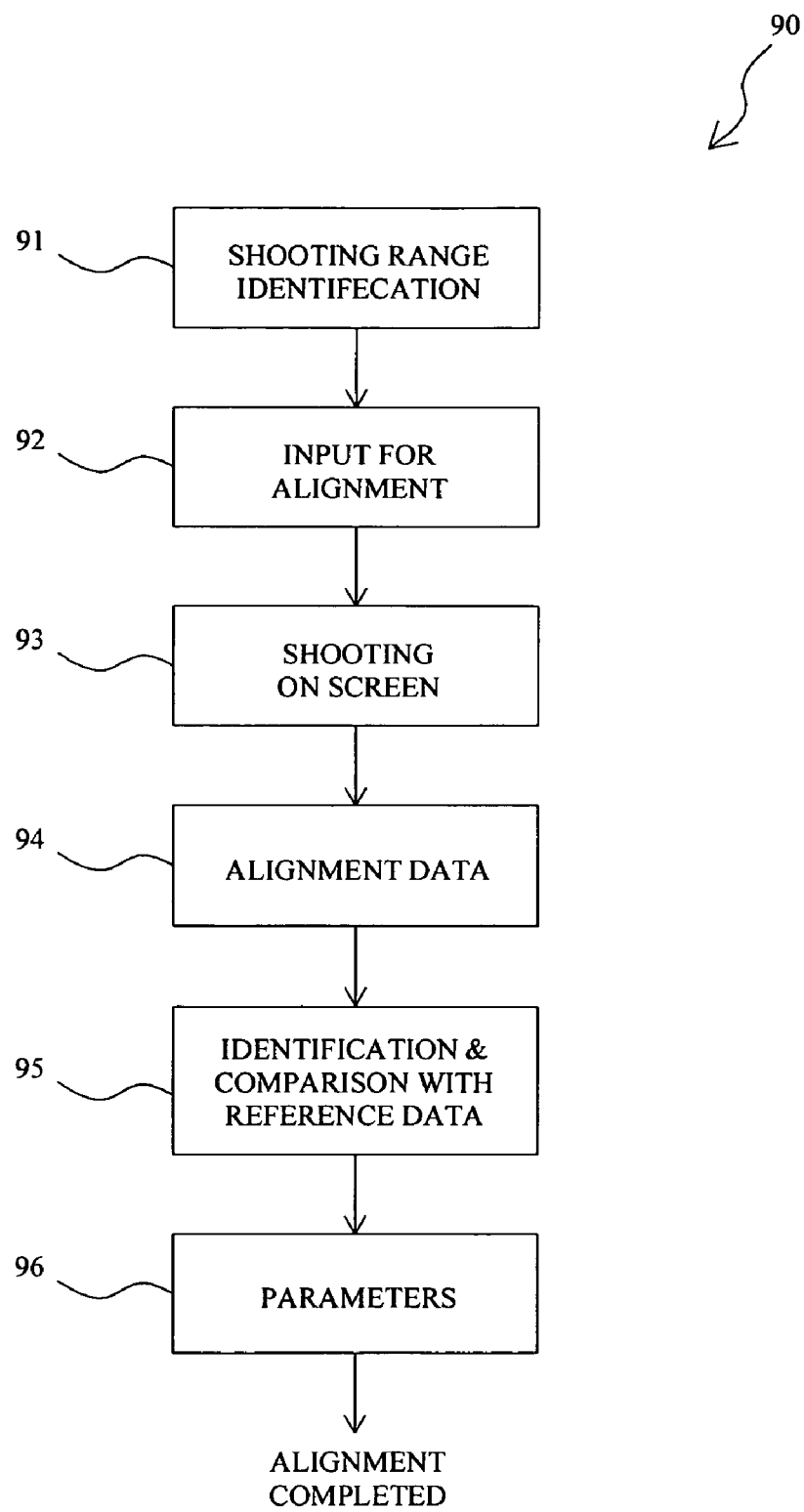
FIG. 10 shows a flowchart of an alignment procedure for a pointing input system according to the present invention.

As shown in FIG. 10, in a flowchart 90 of an alignment procedure for a pointing input system according to the present invention, the shooting range of an array sensor on a screen is first identified in step 91, an input for alignment is applied on the screen in step 92, the screen is shot by the array sensor in step 93, an alignment data is generated in step 94, the alignment data is identified and compared with a reference data in step 95, and an optical distortion information and a spatial rotation and displacement information is finally determined in step 96. The alignment data includes the image information of the input for alignment shot by the array sensor, and the reference data includes the predetermined image information of the input for alignment that is provided to apply on the screen, and therefore from the alignment data and reference data, the spatial relationship between the array sensor and screen and the optical distortion of the lens in the array sensor are able to be determined. Specifically, the optical distortion information and spatial rotation and displacement information picture the optical distortion of the optical lens in the array sensor and the spatial relationship between the array sensor and screen, and with which, the light spots applied on the screen after the alignment procedure are precisely identified for their positions.

Flowchart of Pointing Input Method

Figure 11:
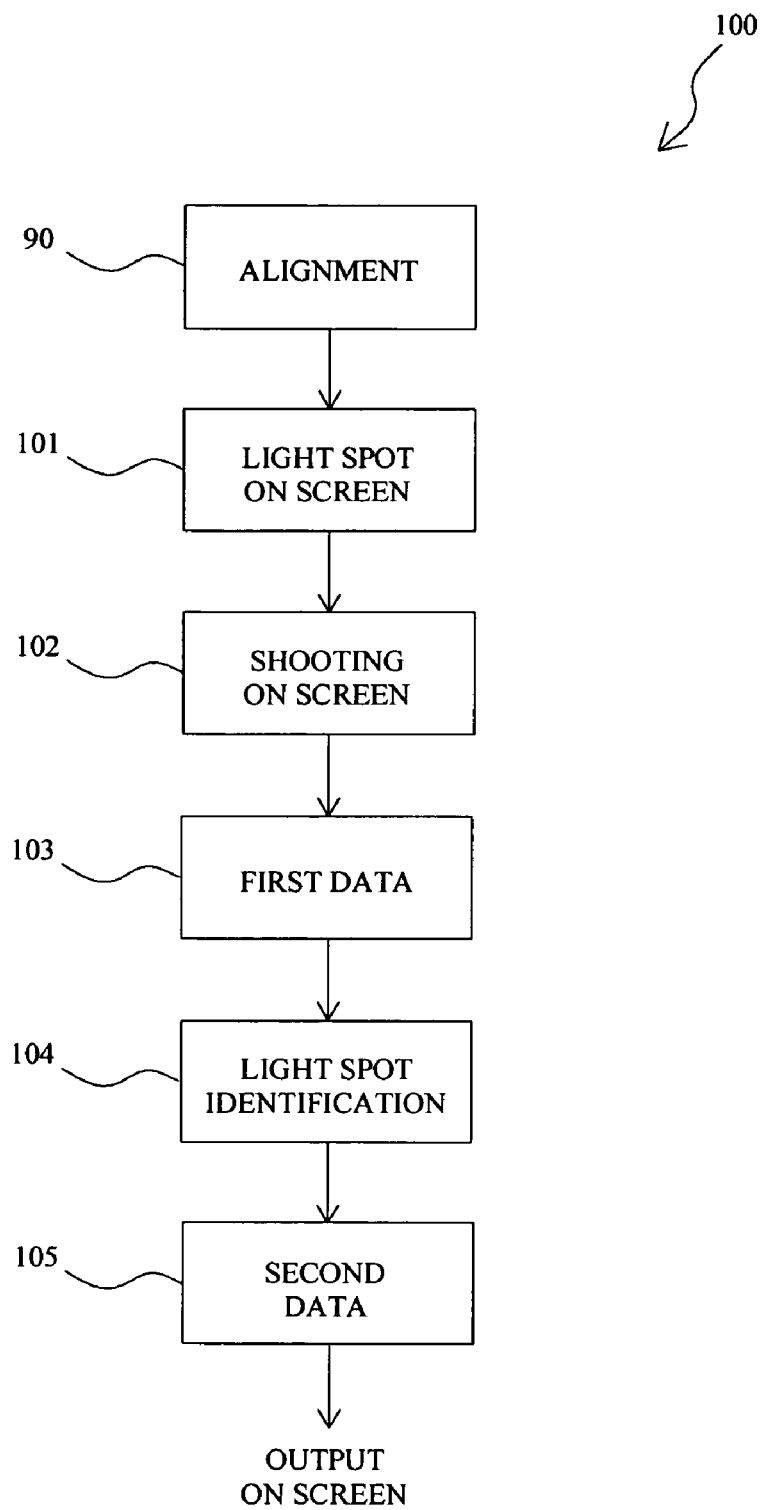
FIG. 11 shows a flowchart of a pointing input method according to the present invention.

FIG. 11 shows a flowchart 100 of a pointing input method according to the present invention. After the step 90 for alignment as shown in FIG. 10 is completed, in step 101 a pointer is used to apply a light spot on a screen, the screen is shot by an array sensor in step 102, and a first data including the image information of the shot light spot is generated in step 103. The first data is then identified in step 104 to generate a second data including the position information of the light spot on the screen based on the optical distortion information and spatial rotation and displacement information determined by the alignment procedure 90. The second data is provided for an information system to generate a correlated output applied on the screen by a display system in step 105.

Embodiment of Pointer

Figure 12:
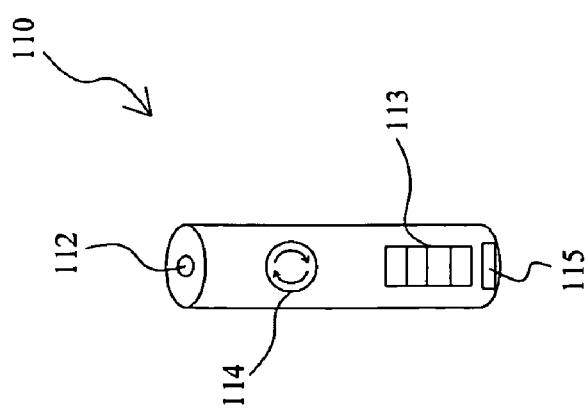
FIG. 12 shows an embodiment of a pointer available for a pointing input system according to the present invention.

As shown in FIG. 12, a pointer 110 available for a pointing input system according to the present invention comprises a set of light sources 112 having different properties, several buttons 113, a roller 114 and a switch 115. The light sources 112 are used for applying light spots on a screen, and the buttons 113 and roller 114 are used to switch the light sources 112 between different optical features, such as brightness, hue, size and shape. The optical features of the light sources 112 may be used for a trigger signal of an action, for example a pressing of a left button of a mouse. The light sources 112 may output light beams having one of several specific wavelengths or blinking with one of specific patterns, to be distinguished from the environment light and the light emitted by the display system, and to be sensitive by the array sensor, and it may also serve as an indication signal. Infrared Ray (IR) LED, visible light LED, and laser diode may be used for the light sources 112. The switch 115 may be a contacting or non-contacting switch, to determine the pointer 110 to touch on the screen, so as to produce different input effects, for example to be at an input state. If the switch 115 is able to generate an analog output, it may be used to determine a signal representative of the input pressure, so as to feature a pen stroke. The pointer 110 may be used as a pen for direct inputs on a screen, for example applying a light spot on a screen by pressing the switch 115, or drawing a line by continuously moving a light spot on a screen. The pointer 110 may also be used as a mouse for one click, double click, or drag on a screen.

Identification of Light Spot

Figure 13:
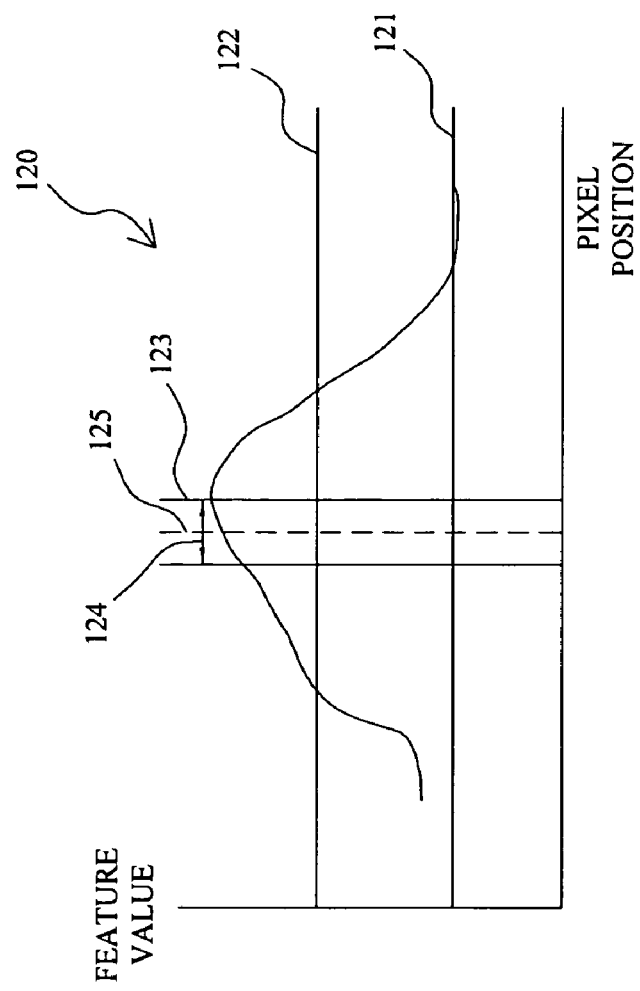
FIG. 13 shows an illustrative diagram for an identification of a light spot.

FIG. 13 shows an illustrative diagram for an identification of a light spot according to the present invention. The image of a light spot mapped onto an array sensor generally occupies a size of tens to hundreds of pixels, but not a single pixel, and therefore the image of the light spot captured by the array sensor will have a distribution of optical features such as the brightness. Based on a background noise 121 and a threshold 122 to determine the input spot, for example by selecting the position 123 having the maximum of the optical feature, or the position 124 having the center mass of the optical feature, or the central position 125 in the range having the optical feature close to the threshold 122 as the position of the light spot, it is able to eliminate the interference of the background noise, and high stability and high precision are obtained for the light spot.

After identifying the position of a light spot, the position is stored to further monitor the continuous movement of the light spot and track the relative position of the light spot. Preferably, the relative position of the light spot is used for an information of determining a trigger signal representative of an action or a pen stroke.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set fourth in the appended claims.

What is claimed is:

1. A pointing input method for an input system, the input system including a display system, a screen, an array sensor fixedly positioned in the vicinity of the screen, an optical lens in the array sensor, and a pointer isolated from the array sensor, said pointing input method comprising the steps of:

using the array sensor to shoot a test pattern on the screen in order to obtain alignment data including image information of the test pattern;

performing an alignment procedure for obtaining/using optical distortion information about the optical lens in the array sensor, spatial rotation, and displacement information from the alignment data;

applying a light spot on the screen by the pointer;

observing the screen with the array sensor to generate first data including image information of the light spot;

generating second data including position information of the light spot from the first data based on the optical distortion information and spatial rotation and displacement information generated from the alignment procedure; and applying a correlated output on the screen based on the second data by the display system, wherein the step of generating second data comprises checking the first data to find a group of nearby pixels that constitute a first data spot based on at least one optical feature.

2. The method of claim 1, wherein alignment data is generated using the test pattern that is shot on the screen, and wherein the step of performing an alignment procedure comprises the step of:

comparing the alignment data with reference data for generating the optical distortion information and spatial rotation and displacement information.

3. The method of claim 2, wherein the test pattern comprises optical spots displayed at a plurality of positions on the screen.

4. The method of claim 2, wherein the test pattern comprises a chessboard pattern, a square pattern, or a cross pattern.

5. The method of claim 2, wherein the reference data comprises a plurality of spatial coordinates of the test pattern.

6. The method of claim 2, wherein the step of performing an alignment procedure further comprises a bilinear interpolation for coordinates computations.

7. The method of claim 1, further comprising identifying a shooting range of the array sensor on the screen.

8. The method of claim 1, wherein the screen comprises a planar surface, a regularly curved surface, or an irregularly curved surface.

9. The method of claim 1, wherein the screen comprises a scattering screen, a CRT screen, an LCD screen, a plasma screen or a rear projection screen.

10. The method of claim 1, wherein the pointer comprises a plurality of light sources having different properties, a plurality of buttons and means for generating various trigger signals representative of different actions.

11. The method of claim 10, wherein the pointer further comprises a switch for determining when to apply the light spot to the screen for conducting different inputs.

12. The method of claim 1, wherein the array sensor comprises an optical lens and an optical filter for mapping onto the array sensor and filtering out optical noise to thereby enhance an identification effect.

13. The method of claim 1, wherein the display system comprises a front projector or a rear projector.

14. The method of claim 1, wherein the step of generating second data further comprises the step of:
obtaining information including a size, an average brightness, a hue, a length, a width and an area of the first data spot.

15. The method of claim 1, wherein the at least one optical feature comprises at least one of the brightness, the hue, the size and the shape.

16. The method of claim 1, wherein the at least one optical feature is used for determining a trigger signal of an action.

17. The method of claim 1, further comprising monitoring a continuous movement of the light spot and tracking a relative position of the continuous movement.

18. The method of claim 17, wherein the relative position is used for determining a trigger signal of an action or a pen stroke.

19. A pointing input system comprising:
an array sensor for shooting a test pattern on a screen;
a first buffer for storing reference data and alignment data generated following the shooting of the test pattern on the screen by the array sensor;
a processor for obtaining/using optical distortion information and spatial rotation and displacement information by analyzing the alignment data in comparison with the reference data;
a second buffer for storing the optical distortion information and spatial rotation and displacement information;
a pointer, isolated from the array sensor, for applying a light spot on the screen for the array sensor to observe in order to generate first data including image information of the light spot; and
an identification system for retrieving second data including position information of the light spot from the first data based on the optical distortion information and the spatial rotation and displacement information for a display system to apply a correlated output on the screen, wherein the identification system comprises:
a register to provide data about at least one optical feature,
a third buffer for storing the first data, and
a second processor for checking the first data to find a group of nearby pixels that constitute a first data spot based on the at least one optical feature.

20. The pointing input system of claim 19, wherein the array sensor comprises a viewing window or a light beam for identifying a shooting range of the array sensor on the screen.

21. The pointing input system of claim 19, wherein the array sensor comprises an optical lens and an optical filter for mapping onto the array sensor and filtering out an optical noise to thereby enhance identification effect.

22. The pointing input system of claim 19, wherein the pointer comprises a plurality of light sources having different properties, a plurality of buttons and means for generating various trigger signals representative of different actions.

23. The pointing input system of claim 22, wherein the pointer further comprises a switch for determining when to apply the light spot to the screen for conducting different inputs.

24. The pointing input system of claim 19, wherein:
the second processor additionally checks the first data to obtain information including size, average brightness, hue, length, width and area of the first data spot.

25. The pointing input system of claim 19, wherein the at least one optical feature comprises at least one of brightness, hue, size and shape.

26. The pointing input system of claim 19, wherein the at least one optical feature is used for determining a trigger signal of an action.

27. The pointing input system of claim 19, wherein the identification system further monitors a continuous movement of the light spot and tracks a relative position of the continuous movement.

28. The pointing input system of claim 27, wherein the relative position is used for determining a trigger signal of an action or a pen stroke.

29. The pointing input system of claim 19, wherein the display system comprises a front projector or a rear projector.

30. The pointing input system of claim 19, wherein the screen comprises a planar surface, a regularly curved surface, or an irregularly curved surface.

31. The pointing input system of claim 19, wherein the screen comprises a scattering screen, a CRT screen, an LCD screen, a plasma screen or a rear projection screen.

32. A pointing input method for an input system, the input system including a display system, a screen, an array sensor fixedly positioned in the vicinity of the screen, an optical lens in the array sensor, and a pointer isolated from the array sensor, said pointing input method comprising the steps of:
using the array sensor to shoot a test pattern on the screen in order to obtain alignment data including the image information of the test pattern;
performing an alignment procedure for obtaining/using optical distortion information about the optical lens and the array sensor, spatial rotation and displacement information from the alignment data;
applying a light spot on the screen by the pointer;
observing the screen with the array sensor to generate a first data including image information of the light spot;
generating second data including position information of the light spot from the first data based on the optical distortion information and spatial rotation and displacement information generated from the alignment procedure; and applying a correlated output on the screen based on the second data by the display system, wherein the step of generating second data comprises:
  checking the first data to find a group of nearby pixels that constitute a first data spot based on at least one optical feature; and
  obtaining information including a size, an average brightness, a hue, a length, a width and an area of the first data spot.

33. A pointing input system comprising:

an array sensor for shooting a test pattern on a screen;

a first buffer for storing reference data and alignment data generated following the shooting of the test pattern on the screen by the array sensor;

a processor for obtaining/using optical distortion information and spatial rotation and displacement information by analyzing the alignment data in comparison with the reference data;

a second buffer for storing the optical distortion information and spatial rotation and displacement information;

a pointer, isolated from the array sensor, for applying a light spot on the screen for the array sensor to observe in order to generate first data including image information of the light spot; and an identification system for retrieving second data including a position information of the light spot from the first data based on the optical distortion information and the spatial rotation and displacement information for a display system to apply a correlated output on the screen, wherein the identification system comprises:
  a register to provide data about at least one optical feature;
  a third buffer for storing the first data; and
  a second processor for checking the first data to find a group of nearby pixels that constitute a first data spot based on the at least one optical feature, and for checking the first data to obtain an information including size, average brightness, hue, length, width and area of the first data spot.

* * * * *